United States Patent [19]

Masu et al.

[11] Patent Number: 4,877,847

[45] Date of Patent: Oct. 31, 1989

[54] POLYPHENYLENE ETHER RESIN COMPOSITION

[75] Inventors: Masanobu Masu, Toyonaka; Hiroshi Yoshioka, Tokyo; Kenzi Kouno, Toyonaka; Isao Nomura, Hiratsuka; Kazuo Yamamiya, Chigasaki, all of Japan

[73] Assignee: Mitsubishi Gas Chemical Company, Inc., Tokyo, Japan

[21] Appl. No.: 94,884

[22] Filed: Sep. 10, 1987

[30] Foreign Application Priority Data

Sep. 10, 1986 [JP] Japan ................................ 61-211480
Mar. 24, 1987 [JP] Japan ................................ 62-68096
Mar. 24, 1987 [JP] Japan ................................ 62-68097

[51] Int. Cl.$^4$ ..................... C08G 65/48; C08G 71/04; C08G 77/10
[52] U.S. Cl. ........................................ 525/397; 528/347
[58] Field of Search ........................................ 525/397

[56] References Cited

FOREIGN PATENT DOCUMENTS 66452 4/1984 Japan ................................ 525/397

Primary Examiner—Jacob Ziegler
Attorney, Agent, or Firm—Wenderoth, Lind & Ponack

[57] ABSTRACT

A polyphenylene ether resin composition comprising
(A) a polyphenylene ether resin modified with a 1,2-substituted olefin compound having an acid anhydride group, the polyphenylene either resin before modification having structural units represented by the following

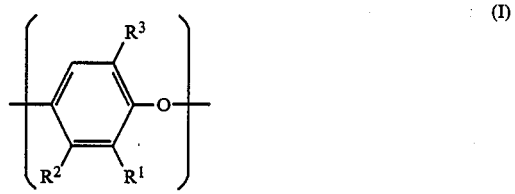

(I)

wherein $R^1$ represents a lower alkyl group having 1 to 3 carbon atoms, and $R^2$ and $R^3$, independently from each other, represent a hydrogen atom or a lower alkyl group having 1 to 3 carbon atoms, in the main chain, and (B) a polyamide resin having recurring units represented by the following formula (II)

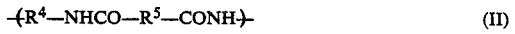

(II)

wherein $R^4$ represents a xylylene group, and $R^5$ represents a linear alkylene group having 4 to 10 carbon atoms.

1 Claim, No Drawings

POLYPHENYLENE ETHER RESIN COMPOSITION

This invention relates to a polyphenylene ether resin composition. More specifically, it relates to a polyphenylene ether resin composition comprising a modified polyphenylene ether resin and a polyamide and as required, a rubber-modified styrene polymer and/or glass fibers, and having excellent moisture absorption characteristics, moldability, mechanical properties and impact strength.

Polyphenylene ether resins have excellent thermal, mechanical and electrical properties, but have the defect of being inferior in moldability because the melt processing temperatures for them is high and their flowability is low. They have strong resistance to inorganic chemicals such as acids and alkalies, but in contact with certain kinds of organic solvents, these resins are dissolved or swollen. It has been strongly desired therefore to improve the solvent resistance and oil resistance of the polyphenylene ether resins.

As an attempt to improve both moldability and oil resistance, there have been proposed a method comprising incorporating not more than 20% of a polyamide in a polyphenylene ether resin (Japanese Patent Publication No. 997/1970) and a method comprising incorporating 30 to 95% of a polyamide in a polyphenylene ether resin (Japanese Patent Publication No. 41663/1984). The addition of a small amount of polyamide leads to some improvement in moldability, but can never sufficiently improve oil resistance. On the other hand, a large amount of polyamide improves solvent resistance, but gives a brittle material without toughness. This is believed to be due to the inherently poor compatibility between a polyphenylene ether resin and a polyamide resin.

Various methods have previously been known for enhancing compatibility between a polyphenylene ether resin (to be referred to as PPE) and a polyamide resin. They include, for example a method in which a compound having a carbon-carbon double bond and a functional group such as a carboxylic acid group, an acid anhydride group, an acid amide group or an imide group in the molecule, such as maleic acid or maleimide, is incorporated as a third component in a composition comprising PPE and a polyamide (Japanese Laid-Open Patent Publication No. 26913/1981); a method in which a 1,2-substituted olefin compound having a carboxyl group or an acid anhydride structure is reacted with PPE in the presence of a radical initiator (Japanese Patent Publication No. 66452/1984); a method in which a copolymer of a styrene compound and an alpha,beta-unsaturated dicarboxylic acid is incorporated in a composition comprising PPE and a polyamide resin (Japanese Patent Publication No. 33614/1984); and a method in which a melt-mixed product of a mixture of PPE and an ethylenically unsaturated carboxyl compound is blended with a polyamide (Japanese Laid-Open Patent Publication No. 138553/1987). The addition of maleic anhydride or maleimide as a third component to the composition cannot bring about a sufficient improvement in compatibility. Molding of the resulting resin compositions at high temperatures and high speeds as in injection molding gives molded articles which develop delamination or poor appearance, and materials having sufficient toughness are difficult to obtain. Incorporation of a copolymer of maleic anhydride and styrene results in a reduction in thermal resistance. On the other hand, a polyamide resin obtained from a xylylenediamine and an alpha,omega-linear aliphatic dicarboxylic acid has excellent thermal properties, mechanical properties upon moisture absorption, and solvent resistance, but does not have sufficient impact strength.

It is an object of this invention to provide a polyphenylene ether resin composition having a novel chemical composition.

Another object of this invention is to provide a polyphenylene ether resin composition comprising a modified polyphenylene ether resin and a polyamide resin having xylylenediamine as a diamine component.

Still another object of this invention is to provide a polyphenylene ether resin composition having excellent moisture absorption characteristics, moldability, mechanical properties and impact strength.

Yet another object of this invention is to provide a polyphenylene ether resin composition which changes little in properties during water absorption and in dimension and requires only a short cooling time during molding.

Further objects of this invention along with its advantages will become apparent from the following description.

According to this invention, these objects and advantages of the invention are achieved by a polyphenylene ether resin composition comprising (A) a polyphenylene ether resin modified with a 1,2-substituted olefin compound having an acid anhydride group, the polyphenylene ether resin before modification having structural units represented by the following formula (I)

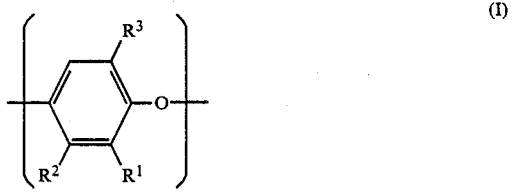

wherein $R^1$ represents a lower alkyl group having 1 to 3 carbon atoms, and $R^2$ and $R^3$, independently from each other, represent a hydrogen atom or a lower alkyl group having 1 to 3 carbon atoms, in the main chain, and (B) a polyamide resin having recurring units represented by the following formula (II)

wherein $R^4$ represents a xylylene group, and $R^5$ represents a linear alkylene group having 4 to 10 carbon atoms.

The modified polyphenylene ether resin (A) constituting the composition of the invention is a modification product of polyphenylene ether having structural units of the following formula (I)

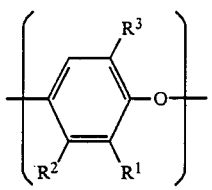

(I)

wherein $R^1$ represents an alkyl group having 1 to 3 carbon atoms, and $R^2$ and $R^3$, independently from each other, represent a hydrogen atom or an alkyl group having 1 to 3 carbon atoms, in the main chain.

The lower alkyl group of 1 to 3 carbon atoms represented by $R^1$, $R^2$ and $R^3$ in formula (I) may be linear or branched, and may, for example, be methyl, ethyl, n-propyl, and isopropyl.

The polyphenylene ether resin of formula (I) may be a homopolymer, a copolymer or a graft copolymer. Specific examples include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, and poly(2-methyl-6-propyl-1,4-phenylene)ether. Poly(2,6-dimethyl-1,4-phenylene)ether and 2,6-dimethylphenol/2,3,6-trimethylphenol copolymer, and grafted copolymers obtained by grafting styrene thereto are especially preferred as the polyphenylene ether resin used in this invention.

The modified polyphenylene ether resin (to be referred to sometimes as the modified PPE) used in this invention is obtained by modifying the above unmodified polyphenylene ether resin with a 1,2-substituted olefin compound having an acid anhydride group (—CO—O—CO—).

Modification of PPE with the 1,2-substituted olefin compound can be achieved by melt-kneading the two compounds under heat in the absence of catalyst. Melt-kneading may be carried out by using conventional machines such as a kneader, a Banbury mixer and an extruder. From the viewpoint of operability, the extruder is preferably used. As required, the modification of PPE with the 1,2-substituted olefin compound may be carried out in the presence of a radical initiator such as benzoyl peroxide, dicumyl peroxide or cumene hydroperoxide.

Examples of the 1,2-substituted olefin compound having an acid anhydride group are maleic anhydride, itaconic anhydride, and citraconic anhydride. The maleic anhydride is especially preferred.

The amount of the acid anhydride required for modifying PPE is 0.01 to 10 parts by weight, preferably 0.1 to 3 parts by weight, especially preferably 0.1 to 1 parts by weight, per 100 parts by weight of PPE. If the acid anhydride is used in smaller amounts, the effect of improving compatibility between PPE and the polyamide resin is small, and a tough composition is difficult to obtain. If it is used in larger amounts, troubles such as thermal decomposition of the excess of the acid anhydride occur, and undesirable phenomena such as reduced thermal resistance and poor appearance occur in the resulting resin composition.

The polyamide resin (B) constituting the resin composition of this invention is composed of structural units represented by the following formula (II)

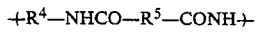

(II)

wherein $R^4$ represents a xylylene group, and $R^5$ represents a linear alkylene group having 4 to 10 carbon atoms.

Preferably, the xylylene group for $R^4$ in formula (II) is, for example, a m-xylylene or p-xylylene group.

The linear alkylene group having 4 to 10 carbon atoms for $R^5$ may be a polymethylene group having 4 to 10 carbon atoms, such as a tetramethylene, pentamethylene, hexamethylene, heptamethylene, octamethylene, nonamethylene or decamethylene group.

The polyamide resin (B) may be obtained by polycondensing a xylylenediamine and an alpha,omega-linear alkylene dibasic acid in a customary manner.

The xylylenediamine may, for example, be m-xylylenediamine, p-xylylenediamine or a mixture thereof, particularly a mixture of at least 60 mole % of m-xylylenediamine and not more than 40 mole % of p-xylylenediamine.

Examples of the alpha,omega-linear alkylene dibasic acid are adipic acid, sebacic acid, suberic acid, undecanoic acid and dodecanoic acid. Adipic acid and sebasic acid are preferred.

The blending weight ratio of the modified PPE (A) to the polyamide resin (B) may be varied over a wide range, preferably from 0.1 to 5, especially preferably from 0.3 to 3. If this ratio is outside the range specified, there is an increasing tendency toward deterioration in water resistance, dimensional stability and oil resistance which are the characteristics of the modified PPE (A)/polyamide resin (B) composition.

The resin composition of this invention may, as required, further contain polyhexamethylene adipamide (nylon 66). The resin composition of this invention containing nylon 66 is particularly conducive to shortening of the molding cycle. The proportion of nylon 66 to be added may effectively range over a wide range from the standpoint of shortening the molding cycle. But when the physical properties of the resulting molded article are considered also, it is 0.03 to 6 parts, preferably 0.03 to 4 parts, by weight per part by weight of the polyamide resin (B). If it is less than the specified lower limit, there is no appreciable effect on the shortening of the molding cycle. If, on the other hand, it exceeds the specified upper limit, the resulting composition greatly decrease in strength and changes in dimension upon water absorption and troubles in practical applications occur.

The proportion of the modified PPE (A) to be blended is preferably 0.1 to 5 times, especially preferably 0.3 to 3 times, the total weight of the polyamide resin (B) and nylon 66. If the proportion of the modified PPE (A) is below the specified lower limit, the effect of improving thermal resistance and water absorption characteristics is small. If it exceeds the specified upper limit, the flowability of the molten resin is undesirably reduced during molding.

If required, the resin composition of this invention may further comprise a rubber-modified styrene resin. The resin composition of this invention containing the rubber-modified styrene resin has especially improved toughness.

The rubber-modified styrene resin used in this invention is a rubber-modified styrene polymer obtained by copolymerizing a conjugated diolefin compound and styrene with or without at least one monovinyl compound copolymerizable with the conjugated diolefin compound.

Examples of the rubber-modified styrene resin used in this invention are polybutadiene-styrene copolymer, polybutadiene-acrylonitrile-styrene copolymer and polybutadiene-methyl methacrylate-styrene copolymer.

The amount of the rubber-modified styrene resin is 2 to 100 parts by weight, preferably 5 to 60 parts by weight, per 100 parts by weight of the polyamide resin (B) and nylon 66 combined. If it is smaller than the specified lower limit, there is no appreciable effect of improving toughness. If, on the other than, it exceeds the specified upper limit, mechanical properties such as strength and modulus are reduced and the resulting composition has a low heat distortion temperature. Consequently, troubles occur in practical applications.

The resin composition of this invention comprising the polyamide resin (B), nylon 66 and the rubber-modified styrene resin may further contain a fibrous reinforcing material such as glass fibers and carbon fibers. Furthermore, as required, it may contain various additives for polymeric materials, such as stabilizers, pigments, dyes, mold releasing agents, lubricants and fillers.

According to this invention, there is also provided a resin composition comprising the modified PPE (A), the polyamide resin (B), nylon 66 and glass fibers.

The suitable amount of the glass fibers is 10 to 150 parts by weight per 100 parts by weight of the modified PPE (A), the polyamide resin (B) and nylon 66 combined. If the amount of the glass fibers is smaller than the specified lower limit, no sufficient effect is obtained of improving mechanical properties and heat distortion temperature. If it is larger than the specified upper limit, the composition in the molten state has reduced flowability, and operational troubles occur during injection molding, and the surface condition of the resin tends to be worse.

A fibrous reinforcing material such as carbon fibers may be incorporated in this composition. Furthermore, as required, it may further comprise various additives generally used for polymeric materials, such as stabilizers, pigments, dyes, mold releasing agents, lubricants, and fillers.

This resin composition may be produced by melt-kneading the ingredients by using an ordinary vent-type extruder or the like. The melt-kneading temperature is preferably 5° to 50° C. higher than the melting point of the resin composition.

The following Examples and Comparative Examples illustrate the present invention more specifically. All parts in these examples are by weight.

EXAMPLE 1 AND COMPARATIVE EXAMPLE 1

Maleic anhydride (25 g) was added to 5 kg of PPE having an inherent viscosity, measured in chloroform at 25° C., of 0.45 dl/g, and they were mixed for 3 minutes by a supermixer. Then, the mixture was melt-kneaded under heat in a twin-screw extruder to give maleic anhydride-modified PPE.

Fifty parts of the resulting maleic anhydride-modified PPE and 50 parts of m-xylylene adipamide resin obtained by polycondensation of m-xylylenediamine and adipic acid and having a melting point, measured by DSC, of 230° C. (produced by Mitsubishi Gas Chemical Company, Inc.; to be referred to as nylon MXD6) were dry-blended by a tumbler, and then melt-mixed in an extruder to give a resin composition.

The resin composition was molded by a molding machine to form various test pieces. The properties of the test pieces measured are shown in Table 1.

Tensile strength was measured in accordance with ASTM D638, and flexural modulus, in accordance with ASTM D790.

For comparison, a resin composition was prepared in the same way as above except that nylon 66 was used instead of the nylon MXD6. The results are also shown in Table 1 (Comparative Example 1).

Table 1 shows that the resin composition of Example 1 show little deterioration in mechanical properties after water absorption.

TABLE 1

| Test item | Example 1 | Comparative Example 1 |
|---|---|---|
| Heat distortion temperature (°C.) | 144 | 170 |
| Tensile strength (kg/cm$^2$) | | |
| After drying (*1) | 873 | 760 |
| After moisture absorption (*2) | 803 | 650 |
| Flexural modulus (kg/cm$^2$) | | |
| After drying (*1) | 32,400 | 26,100 |
| After moisture absorption (*2) | 30,100 | 23,300 |

(*1): After drying
After molding, the molded article was left to stand for 24 hours at 23° C. and 50% RH, and then subjected to measurement.
(*2): After moisture absorption
The molded article was immersed in water at 23° C., then taken out and wiped free of adhering moisture, and thereafter subjected to measurement in an atmosphere at 23° C. and 50% RH.

EXAMPLE 2 AND COMPARATIVE EXAMPLE 2

Maleic anhydride (25 g) was added to 5 kg of PPE (Iupiace CPX 100, a tradename for a product of Mitsubishi Gas Chemical Co., Ltd.), and they were mixed for 30 minutes by a supermixer. The mixture was melt-kneaded at 300° C. in a twin-screw extruder to give maleic anhydride-modified PPE.

The resulting maleic anhydride-modified PPE (42.5 parts), 42.5 parts of nylon MXD6 having a number average molecular weight of 1600, 5 parts of nylon 66 having a number average molecular weight of 18000 and 10 parts of styrene/butadiene copolymer having a number average molecular weight of 60000 and a combined styrene content of 43% by weight (Stereon 840A, a tradename for a product of Firestone Company) were mixed in a mixer and melt-kneaded in a single-screw extruder at a cylinder temperature of 285° C. and extruded into a strand. The strand was cooled with ice, cut into pellets and dried to give a resin composition.

The pellets were molded by an injection-molding machine at a mold temperature of 130° C. and a cylinder temperature of 285° C. to prepare various test pieces. The properties of the test pieces were measured, and the results are shown in Table 2.

For comparison, a resin composition was prepared from 47.5 parts of nylon MXD6, 42.5 parts of the modified PPE and 10 parts of styrene-butadiene copolymer (the same as those used in Example 2 above) was prepared, and its properties were measured as above. The results are also shown in Table 2 (Comparative Example 2).

The results demonstrate that the addition of nylon 66 greatly shortened the time required for cooling during molding.

TABLE 2

| Proportions and test items | Example 2 | Comparative Example 2 |
|---|---|---|
| Proportions (parts) | | |
| Nylon MXD6 | 42.5 | 47.5 |
| Nylon 66 | 5 | 0 |
| Modified PPE | 42.5 | 42.5 |
| Styrene/butadiene copolymer | 10 | 10 |
| Properties | | |
| Tensile strength (kg/cm$^2$) | | |
| After drying (*1) | 641 | 650 |
| After moisture absorption (*2) | 587 | 582 |
| Flexural modulus (10$^3$ kg/cm$^2$) | | |
| After drying (*1) | 26 | 30 |
| After moisture absorption (*2) | 24 | 26 |
| Izod impact strength (notched) (*3) (kg-cm/cm) | 6.7 | 5.9 |
| Moldability | | |
| Time required for cooling (*4) (sec) | 16 | 30 |
| Molding pressure (kg/cm$^2$) | 420 | 420 |

(*1) and (*2): Same as the footnote to Table 1.
(*3): Measured after drying (*1).
(*4): In injection molding at a molding temperature of 130° C. by an injection molding machine, the time required for cooling until the surface hardness of the molded article immediately after mold opening reaches a Barcol hardness of 20.

EXAMPLES 3-4

Maleic acid (50 g) was added to 5 kg of PPE (Iupiace CPX 100, a tradename for a product of Mitsubishi Gas Chemical Company, Inc.), and they were mixed by a supermixer for 3 minutes. The mixture was melt-kneaded at 300° C. in a twin-screw extruder to give maleic anhydride-modified PPE.

The resulting maleic anhydride-modified PPE (35 parts), 30 parts of nylon MXD6 having a number average molecular weight of 16000, 5 parts of nylon 66 having a number average molecular weight of 18000 and 30 parts of chopped strands of glass fibers having a length of 3 mm were blended and melt-kneaded in a single-screw extruder at a cylinder temperature of 285° C. and extruded into a strand. The strand was cooled, cut into pellets, and dried to form a molding resin composition.

The pellets were molded by an injection-molding machine at a mold temperature of 130° C. and a cylinder temperature of 285° C. to prepare various test pieces.

The flexural strength, flexural modulus and coolant resistance within a temperature range of 20° to 140° C. of the test pieces were measured. The results are shown in Table 3.

The methods of measurements were as follows:
(1) Flexural strength: ASTM D790
(2) Flexural modulus: ASTM D790
(3) Coolant resistance:

Retention: The test piece was immersed for 7 days at 120° C. in a coolant liquid (Yamaha Long Life Coolant 1 PC, made by Yamaha Engine Co., Ltd.). The retention is the percentage of the tensile strength of the test piece measured after immersion based on its tensile strength. (The tensile strength was measured in accordance with ASTM D638.)

Weight increase: The percent increase in weight when the above retention is measured.

TABLE 3

| Proportions and test items | Example 3 | Example 4 |
|---|---|---|
| Proportions (parts) | | |
| Nylon MXD6 | 20 | 30 |
| Nylon 66 | 10 | 5 |
| Modified PPE | 20 | 15 |
| Glass fibers | 50 | 50 |
| Properties | | |
| Flexural strength (kg/cm$^2$) | | |
| Temperature (°C.) | | |
| 20 | 3010 | 3320 |
| 80 | 2250 | 2400 |
| 100 | 1930 | 2000 |
| 120 | 1610 | 1680 |
| 140 | 1460 | 1510 |
| Flexural modulus (10$^3$ kg/cm$^2$) | | |
| Temperature (°C.) | | |
| 20 | 142 | 145 |
| 80 | 107 | 105 |
| 100 | 92 | 82 |
| 120 | 85 | 73 |
| 140 | 74 | 70 |
| Coolant resistance | | |
| Retention of tensile strength (%) | 51.6 | 55.1 |
| Weight increase (%) | 3.8 | 4.3 |

EXAMPLES 5-6 AND COMPARATIVE EXAMPLES 3-5

In each run, a resin composition was prepared and molded into test pieces in the same way as in Example 3 except that the amounts of the ingredients were changed as indicated in Table 4.

The tensile strengths and flexural moduli of the test pieces were measured as in Example 1, and the moldabilities of the test pieces were determined as in Example 4.

For comparison, the above procedure was repeated except that nylon MXD6 or nylon 66 was not used in preparing the resin composition.

The results are shown in Table 4.

TABLE 4

| Proportions and test items | Example 5 | Example 6 | Comparative Example 3 | Comparative Example 4 | Comparative Example 5 |
|---|---|---|---|---|---|
| Proportions (parts) | | | | | |
| Nylon MXD6 | 22 | 32 | 0 | 10 | 40 |
| Nylon 66 | 6 | 4 | 30 | 0 | 0 |
| Modified PPE | 22 | 14 | 20 | 40 | 10 |
| Glass fibers | 50 | 50 | 50 | 50 | 50 |
| Properties | | | | | |
| Tensile strength (kg/cm$^2$) | | | | | |
| After drying (*1) | 2380 | 2510 | 2130 | 1990 | 2610 |
| After moisture absorption (*2) | 2365 | 2388 | 1990 | 1980 | 2540 |
| Flexural modulus (10$^3$ kg/cm$^2$) | | | | | |
| After drying (*1) | 124 | 152 | 105 | 144 | 164 |
| After moisture absorption (*2) | 121 | 148 | 94 | 143 | 160 |
| Moldability | | | | | |
| Time required for cooling (*3) (sec) | 15 | 16 | 13 | 13 | 39 |
| Molding pressure (kg/cm$^2$) | 700 | 680 | 800 | 1330 | 770 |

(*1) and (*2): Same as the footnote to Table 1.
(*3): Same as the footnote (*4) to Table 2.

From the results given in Table 4, it is seen that the molding resin compositions comprising the modified PPE and glass fibers and the mixed polyamide of nylon MXD6 and nylon 66 have excellent improved strength, rigidity, water resistance and moldability.

What is claimed is:

1. A polyphenylene ether resin composition comprising (A) a polyphenylene ether resin modified with a 1,2-substituted olefin compound having an acid anhydride group, the polyphenylene ether resin before modification having structural units represented by the following formula (I)

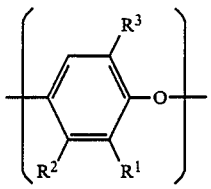

wherein $R^1$ represents a lower alkyl group having 1 to 3 carbon atoms, and $R^2$ and $R^3$, independently from each other, represent a hydrogen atom or a lower alkyl group having 1 to 3 carbon atoms, in the main chain, and (B) a polyamide resin having recurring units represented by the following formula (II)

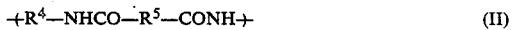

wherein $R^4$ represents a xylylene group, and $R^5$ represents a linear alkylene group having 4 to 10 carbon atoms the weight ratio of the polyphenylene ether resin (A) to the polyamide resin (B) being from 0.3 to 3.

* * * * *